United States Patent [19]

Kaura

[11] Patent Number: 5,657,216
[45] Date of Patent: Aug. 12, 1997

[54] METHOD AND APPARATUS FOR LINEARIZING PULSE WIDTH MODULATION IN OVERMODULATION REGION

[75] Inventor: Vikram Kaura, Cedarburg, Wis.

[73] Assignee: Allen-Bradley Company, Inc., Milwaukee, Wis.

[21] Appl. No.: 555,664

[22] Filed: Nov. 13, 1995

[51] Int. Cl.$^6$ ................................................. H02M 3/24
[52] U.S. Cl. .................................................. 363/41; 363/95
[58] Field of Search ........................... 363/40, 41, 43, 363/95, 131; 318/801, 805, 811

[56] References Cited

U.S. PATENT DOCUMENTS

| | | | |
|---|---|---|---|
| 4,903,187 | 2/1990 | Doi et al. | 363/95 |
| 4,994,951 | 2/1991 | Iwasa et al. | 363/41 |
| 5,121,043 | 6/1992 | Kerkman et al. | 318/805 |
| 5,153,821 | 10/1992 | Blasko | 363/41 |
| 5,182,701 | 1/1993 | Mochikawa et al. | 363/98 |
| 5,329,217 | 7/1994 | Kerkman et al. | 318/811 |

*Primary Examiner*—Matthew V. Nguyen
*Attorney, Agent, or Firm*—Michael A. Jaskolski; John M. Miller; John J. Horn

[57] ABSTRACT

A method and/or apparatus for altering command voltages when a modulation index is greater than unity in order to maintain the linear relationship between the fundamental component of phase voltage and the command voltage in PWM inverter or converter usage. The method and/or apparatus calculates and provides an in phase waveform to be added to the command voltage prior to comparison of the command voltage to a carrier signal, the sum of the waveform and command voltage producing a modified command voltage which maintains said linear relationship.

18 Claims, 5 Drawing Sheets

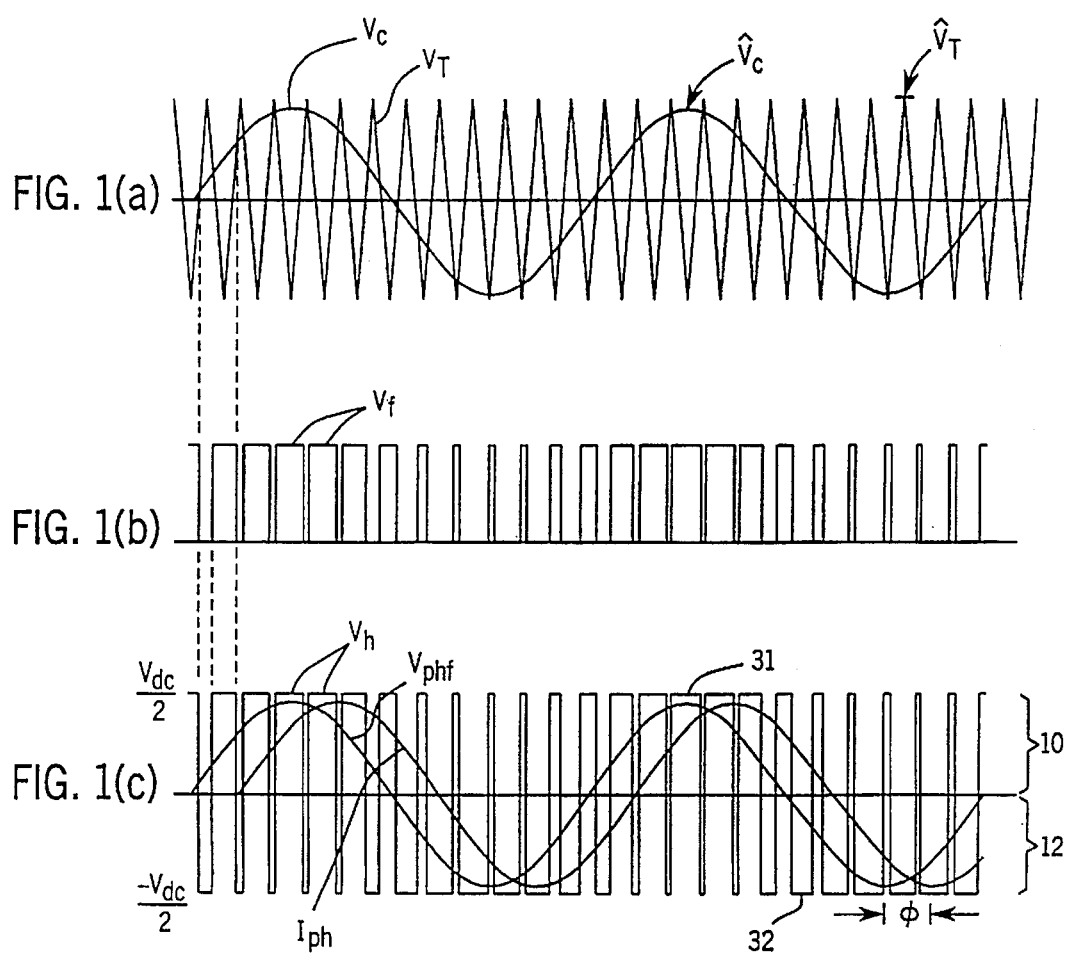

METHOD AND APPARATUS FOR LINEARIZING PULSE WIDTH MODULATION IN OVERMODULATION REGION

FIELD OF THE INVENTION

The field of the invention is electrical power conversion equipment and, more particularly, PWM control methods used with DC to AC inverters and AC to DC converters.

DESCRIPTION OF THE ART

Many AC motor applications require that a motor be driven at various speeds. Motor speed can be adjusted with an adjustable speed drive (ASD) which is placed between a DC voltage source and an associated motor that can excite the motor at various AC frequencies. One commonly used type of ASD uses a pulse width modulated (PWM) inverter and associated PWM controller which can control both voltage and frequency of signals that eventually reach motor stator windings.

Typical motors have three phases which are separately controlled via an inverter and a controller. Referring to FIGS. 1(a)–1(c), although only a single command voltage $V_c$ and signals generated therefrom are illustrated, a three phase PWM inverter for controlling a three phase motor is driven by three such sinusoidal reference voltages, a separate reference voltage corresponding to each of the three motor phases (i.e., each of three motor stator windings). In the interest of providing a simple explanation of a PWM inverter only one sinusoidal command voltage $V_c$ and signals generated therefrom are explained here in detail.

Referring specifically to FIGS. 1(a) and 1(b), a PWM controller receives three sinusoidal command signals $V_c$ and a carrier signal $V_T$, compares each sinusoidal command signal $V_c$ to the carrier signal $V_T$ and generates a firing signal $V_f$ corresponding to each sinusoidal command signal. When a sinusoidal command signal $V_c$ is greater than the carrier signal $V_T$, a corresponding firing signal $V_f$ is high. When a sinusoidal command signal $V_c$ is less than the carrier signal $V_T$, a corresponding firing signal $V_f$ is low.

The firing signals $V_f$ are used to control an associated PWM inverter. A PWM inverter consists of a plurality of switches that alternately connect associated motor stator windings to positive or negative DC voltage buses to produce a series of high frequency voltage pulses that excite the stator windings.

Referring to FIG. 1(c), an exemplary sequence of high frequency pulses $V_h$ that an inverter might generate across a stator winding can be observed along with an exemplary low frequency alternating phase voltage $V_{phf}$. The phase voltage $V_{phf}$ is the fundamental component of the high frequency pulse sequence $V_h$. The high frequency pulses $V_h$ are positive when the firing signal $V_f$ is high and negative when the firing signal $V_f$ is low. The maximum magnitude of each pulse $V_h$ is half the DC potential between the positive and negative DC bus lines. Thus, where the DC potential is $V_{dc}$, the maximum magnitude is $+V_{dc}/2$ and the minimum magnitude is $-V_{dc}/2$.

By firing the PWM switches according to the firing signals $V_f$, the widths of the positive portions 10 of each high frequency pulse relative to the widths of the negative portions 12 over a series of high frequency pulses $V_h$ varies. The varying widths over the period of the command signal $V_c$ generate the low frequency fundamental component alternating phase voltage $V_{phf}$.

The low frequency phase voltage $V_{phf}$ in turn produces a low frequency alternating phase current $I_{ph}$ that lags the voltage by a phase angle $\Phi$. The phase current $I_{ph}$ drives the motor which operates at the frequency of the phase current $I_{ph}$.

By changing the frequency of the sinusoidal command signal $V_c$, the frequency of the phase current $I_{ph}$, and thus the motor speed, can be altered. For example, by increasing the frequency of the sinusoidal command signal $V_c$, the frequency of the phase current $I_{ph}$ can be increased and motor speed can in turn be increased. Motor speed can be decreased by decreasing the sinusoidal command signal $V_c$ frequency.

In addition, by changing the peak-to-peak of the sinusoidal command signal $V_c$ while maintaining a constant frequency, the amplitude of the fundamental component phase voltage $V_{phf}$ can be altered. For example, referring to FIG. 2(a), a carrier signal $V_T$ and a plurality of in phase sinusoidal command signals $V_{c0}$–$V_{c4}$ which are characterized by different peak values are illustrated. FIG. 2(b) illustrates the effective command voltages $V_{c0e}$ through $V_{c4e}$ corresponding to the command voltages $V_{c0}$ through $V_{c4}$ in FIG. 2(a). The effective phase voltages $V_{c0e}$–$V_{c4e}$ are the parts of the command voltages $V_{c0}$–$V_{c4}$ which are below the carrier peak value $\hat{V}_T$. When a zero sinusoidal command signal $V_{c0}$ is provided, the effective command voltage $V_{c0e}$ is zero. On the other hand, where a high sinusoidal command signal $V_{c4}$ is provided (i.e. where the peak sinusoidal command signal is much greater than the peak carrier signal), the effective command voltage $V_{c4e}$ approximates a square wave having a fundamental component $4/\pi$ times the maximum DC voltage value. In the present case, where the maximum DC voltage value is $V_{dc}/2$, the maximum fundamental phase voltage $V_{ph4}$ approaches $2V_{dc}/\pi$. Thus, the range of possible fundamental phase voltages is between 0 and $2V_{dc}/\pi$.

Ideally a linear relationship should exist between the sinusoidal command signals $V_c$ and the fundamental component phase voltage $V_{phf}$ such that any change in the sinusoidal command signal $V_c$ magnitude is mirrored by a linear change in the fundamental component phase voltage $V_{phf}$ magnitude assuming that the maximum phase voltage is not surpassed. Unfortunately, typical PWM controllers can only provide a linear relationship between the control voltage $V_c$ and the fundamental component phase voltage $V_{phf}$ over a reduced range of possible phase voltage.

When a PWM inverter is used to provide a phase voltage outside the reduced linear range, the phase voltage gain is sharply reduced which in turn restricts the range of accurate speed and torque regulation. In other applications such as for utility interfacing as a voltage source converter, reduced gain restricts the range of fluctuations in the utility voltage which can be handled effectively to keep the desired bus voltage and power factor with low harmonic distortion.

Referring again to FIG. 1(a), an amplitude modulation index $M_i$ is defined as the ratio of the peak sinusoidal command signal value $\hat{V}_c$ and the peak carrier signal value $\hat{V}_T$. By increasing the modulation index $M_i$, the amplitude of the fundamental component phase voltage $V_{phf}$ can be increased.

PWM inverter operation can be divided into three modulation index magnitude dependent modes. Referring again to FIGS. 2(a), a first mode of operation is referred to as the linear mode of PWM operation which occurs when the modulation index $M_i$ is less than one. In FIG. 2(a), all three sinusoidal command signals $V_{c0}$, $V_{c1}$, and $V_{c2}$ drive an inverter in this linear mode of operation. Referring also to FIG. 2(c), in the linear mode, any increase in the command voltage magnitude is followed by a linear increase in the fundamental component voltage $V_{phf}$. Referring also to FIGS. 1(a)–1(c), as the command voltage $V_c$ magnitude is increased in the linear mode, the ratio of time during which the command voltage $V_c$ waveform is above the carrier voltage $V_T$ to the time during which it is below the carrier voltage $V_T$ increases linearly which is reflected in the firing signal $\overline{V}_f$, the high frequency voltage pulse $V_h$, and eventually in the magnitude of the phase voltage $V_{phf}$.

Referring again to FIGS. 2(a) and 2(c), the linear relationship between command voltages $V_{c0}$, $V_{c1}$, $V_{c2}$ and related phase voltages $V_{ph0}$, $V_{ph1}$, $V_{ph2}$ can be observed. Referring also to FIG. 3, the phase voltage gain $G_v$ as a function of the modulation index $M_i$ is illustrated. The phase voltage gain $G_v$ is the ratio of the peak fundamental component phase voltage $\hat{V}_{phf}$ to peak command voltage $\hat{V}_c$ times the D.C. bus value $$\left( \text{i.e. } G_v = \frac{\hat{V}_{phf}}{\hat{V}_c} \cdot \frac{v_{dc}}{2} \right).$$

Up to a modulation index $M_i$ of 1.0 the phase voltage gain $G_v$ is constant.

A second mode is the non-linear or pulse dropping mode of operation which occurs when the modulation index $M_i$ exceeds one. In FIG. 2(a), sinusoidal command signals $V_{c3}$ and $V_{c4}$ drive an inverter in this non-linear mode. Here a specific increase in the peak command voltage $\hat{V}_c$ does not linearly increase the peak fundamental component phase voltage $\hat{V}_{phf}$. For example, referring to FIG. 2(c), where an initial command voltage is $V_{c2}$ and the modulation index is 1.0, a 30% increase in the command voltage to $V_{c3}$ where the modulation index is 1.3 may only result in a 13% increase in the resulting phase voltage $V_{ph3}$ (i.e. $V_{ph3}$=1.13 $V_{ph2}$).

Referring still to FIG. 2(a), where the modulation index $M_i$ exceeds one, only the portion of the command voltage $V_{c3}$ which is below the peak value of the carrier voltage $V_T$ is effective for modulation purposes. Referring also to FIG. 3, the phase voltage gain $G_v$ reduces sharply in a non-linear fashion, hence the reference "non-linear mode".

The third mode is often referred to as the six step mode which occurs when the peak value of the command voltage $\hat{V}_e$ is much greater than the peak value of the carrier voltage (i.e. $\hat{V}_c \approx 5\hat{V}_T$). In FIG. 2(a), command voltage $V_{c4}$ corresponds to a modulation index $M_i$ of 5.0 and therefore approaches the six step mode of operation. Here, the effective command voltage $V_{c4e}$ approaches a square wave and the phase voltage gain $G_v$ approaches zero. In this mode, the AC phase voltage $V_{ph4}$ starts to saturate and reach its theoretical maximum of $2V_{dc}/\pi$.

One method which can be used to extend the linear region of PWM operation is to have DC bus voltage maintained at a higher than needed value so that PWM operation always remains within a desired linear region. Besides the added cost of some form of control to maintain a higher bus voltage, this solution results in a cost and size penalty for the DC bus capacitor banks along with increased switching losses.

U.S. Pat. No. 5,329,217 entitled Compensated Feedforward Voltage for a PWM AC Motor Drive which issued to Kerkman, et al. on Jul. 12, 1994, describes another method which can be used to extend the linear region of PWM operation to include the entire range of fundamental phase voltages (i.e. zero to $2V_{dc}/\pi$). In this method, in the non-linear mode of operation, the command voltage $V_c$ is multiplied by a gain factor which increases as an inverse function of the PWM gain. In other words, when the phase voltage gain drops in the non-linear region, the magnitude of the sinusoidal command signal $V_c$ is increased to maintain the desired output voltage. The drawback of this method is that the sinusoidal command signal $V_c$, after being adjusted for the falling gain, results in an extremely high modified command voltage value.

To approach within 0.5% of the sinusoidal command signal $V_c$ required to provide the maximum phase voltage $V_{phf}$ the modulation index $M_i$ typically needs to be pushed to a value of 5.0 or beyond. This means that a PWM controller must be able to handle peak command voltages $\hat{V}_c$ at least as large as five times the peak carrier signal $\hat{V}_T$.

This method runs into implementation problems in both the analog and digital domains. In the analog domain this method is difficult to implement because amplifiers and the like tend to saturate where the command voltage $V_c$ is excessive. In the digital domain, increased command voltage $V_c$ levels require additional memory for storing large digital words needed to identify and differentiate large sinusoidal command signals. These analog and digital problems result in a reduction in the dynamic range of associated control as the PWM controller must handle a wide range of control voltages.

U.S. Pat. No. 5,153,821, entitled Pulse Width Modulation Method For Providing Extended Linearity, Reduced Communication Losses And Increase In Inverter/Converter Output Voltage, which issued to Blasko on Oct. 6, 1992, describes another method for extending the linear range of PWM operation. This method provides a modified non-sinusoidal command signal to the PWM inverter. This method extends the linear range of inverter operation to the point where the modulation index $M_i$ is equal to 1.1547. However, after the modulation index $M_i$ exceeds 1.1547, this method faces the same problems with linear operation as described above.

Therefore, it would be advantageous to have a method for controlling a PWM controller which could extend the linear range of PWM operation to all possible phase voltage values without requiring special hardware or additional memory and without reducing the dynamic range of control by using excessive sinusoidal command signals $V_c$.

SUMMARY OF THE INVENTION

The present invention is a new method to maintain the fundamental component gain of a PWM inverter after a modulation index $M_i$ exceeds unity and the PWM inverter enters the typically non-linear pulse dropping region of operation. The method adds a square wave to a sinusoidal command signal $V_c$ in the non-linear region of operation as a function of the modulation index $M_i$. The addition of the square wave linearizes PWM operation all the way to the six-step mode of operation. The modulation index required by the method does not exceed 1.273 and therefore, the dynamic range of associated control is increased. For practical implementation, a simple function governing the addition of the square wave is suggested.

One object of the present invention is to provide a method whereby a linear relationship can be maintained between a sinusoidal command signal and the fundamental component of output phase voltage. By adding a square wave to a sinusoidal command signal in the non-linear region of PWM operation wherein the square wave is calculated to increase in magnitude as an inverse function of the PWM gain drop-off, linear operation of the PWM inverter (or converter) can be extended so that it covers a range of fundamental phase voltages from zero to $4/\pi$ times the maximum value of the DC voltage.

Another object of the present invention is to extend the range of linear PWM operation without requiring additional hardware or memory and without reducing the dynamic range of associate control. Because the modulation index $M_i$ does not exceed 1.273, the command voltage remains in a relatively minimal range which is not likely to saturate an analog amplifier and which does require additional bits in memory to identify voltage magnitude.

Other and further objects and aspects of the present invention will become apparent during the course of the following description and by reference to the accompanying drawings.

BRIEF DESCRIPTION OF THE DRAWINGS

FIG. 1(a) is a graph illustrating carrier and command voltages, FIG. 1(b) is a graph illustrating resultant firing signals, and FIG. 1(c) is a graph illustrating the high frequency pulses generated by a PWM inverter, a resulting low frequency phase voltage, and an associated fundamental component phase current;

DESCRIPTION OF THE PREFERRED EMBODIMENT

In the following description, all "c" subscripts will refer to sinusoidal command signals, all "f" subscripts will refer to fundamental components of associated signals or voltages, all "^" symbols will identify peak values of corresponding wave forms and all "ph" subscripts will refer to phase signals, unless the description indicates otherwise.

Figure 4A:
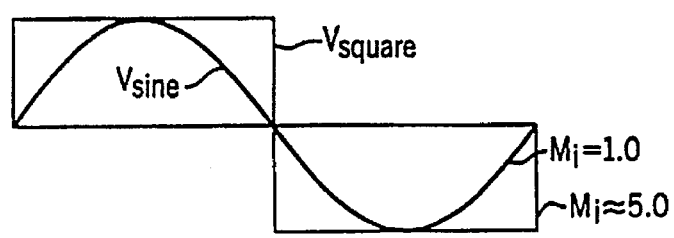
FIG. 4(a) is a graph illustrating the shapes of effective command voltages at the boundaries of the non-linear region of operation.

Referring to FIGS. 1(a) and 4(a), assuming a peak carrier voltage $V_T$ of one, when increasing the command voltage $V_c$ past the point where the modulation index $M_i$ is equal to one, the effective command voltage goes from being a sine wave $V_{sine}$ of unit magnitude at $M_i=1$ to an approximate square wave $V_{square}$ of unit magnitude for $M_i>5.0$. Thus, in order to maintain a linear relationship between the command voltage $V_c$ and a resulting fundamental component of phase voltage where the modulation index $M_i$ is greater than unity, a method must be provided to control the progression of the effective command voltage to maintain the linear relationship.

Figure 4B:
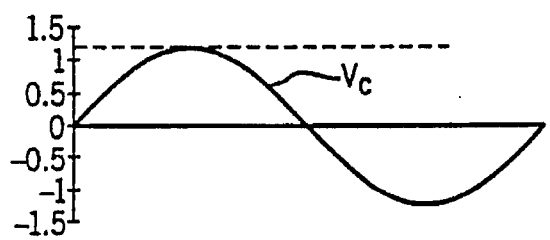
FIG. 4(b) is a graph showing a command voltage where $M_i>1.0$.
Figure 4C:
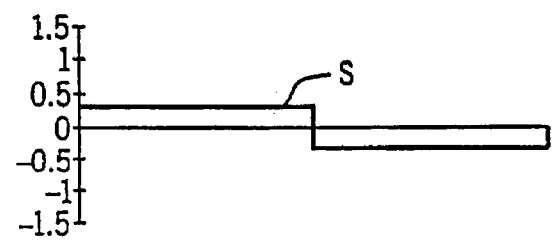
FIG. 4(c) is a graph showing a square wave according to the present invention.
Figure 4D:
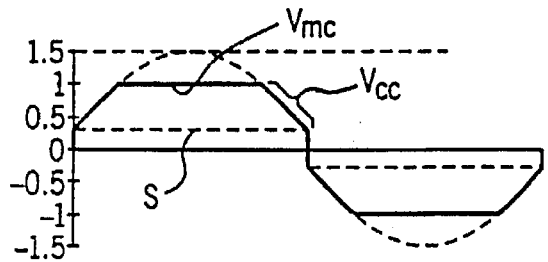
FIG. 4(d) shows a modified effective command voltage.

Referring also to FIGS. 4(b) through 4(d), in the present method, the command voltage $V_c$ is added to an in phase square wave S to produce a modified command or modified effective voltage $V_{mc}$. The modified effective voltage $V_{mc}$ is then compared with the carrier voltage $V_T$ to provide the firing signals to a PWM inverter. The magnitude of the square wave S is a function of the modulation index $M_i$. The modified effective voltage $V_{mc}$ is the summation of a clipped sine wave $V_{cc}$ and the square wave S, the summation never having magnitude greater than unity. To progress into the region where the modulation index $M_i$ greater than one, the square wave S pushes out the clipped sine wave $V_{cc}$ beyond the effective unit boundary, eventually eliminating the sine wave completely to provide a square wave S of unit magnitude at the outer bound.

Analytical Development

Figure 5:
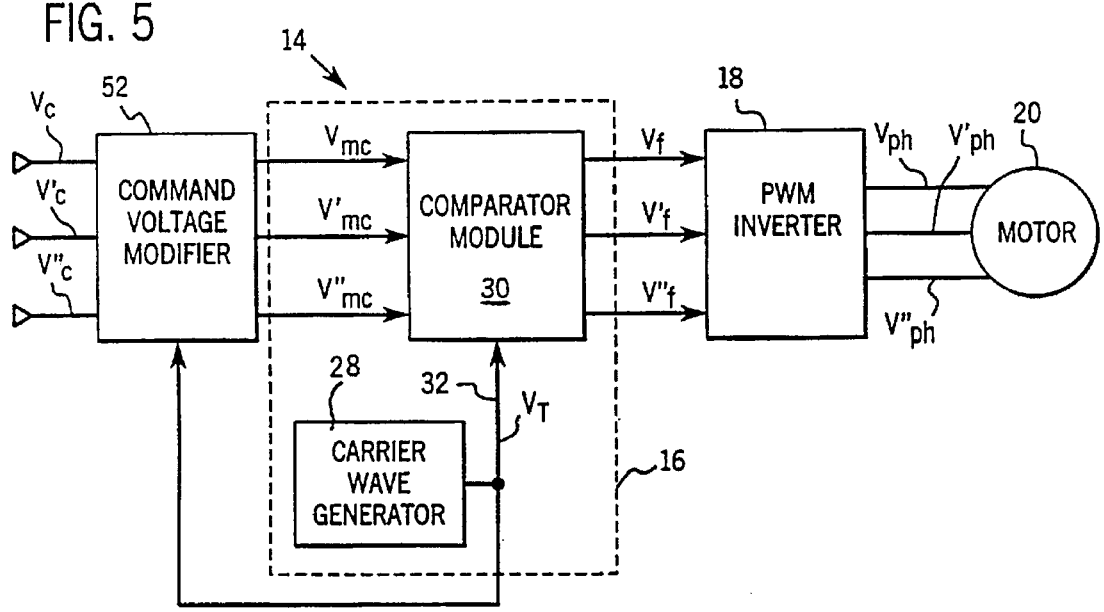
FIG. 5 is a schematic diagram of a motor control system according to the present invention.

Referring to FIG. 5, the fundamental component $V_{mcf}$ of the effective voltage is linearly related to the fundamental component of the phase voltage $V_{phf}$. Thus, by maintaining a linear relationship between the fundamental component $V_{mcf}$ of the modified effective voltage and the magnitude of the command voltage $V_c$, the linear relationship between the peak command voltage $\hat{V}_c$ and the peak fundamental phase voltage $\hat{V}_{phf}$ can be extended.

As well known, where two signals are in phase, the fundamental components of the two signals add to produce a composite fundamental signal. Thus, referring to FIG. 4(d), the fundamental component of the effective command voltage can be determined by adding the fundamental components of the clipped sine wave $V_{cc}$ and the square wave S. Thus:

$$\hat{V}_{mcf}=\hat{S}_f+\hat{V}_{ccf} \quad \text{Eq. 1}$$

Because the fundamental component $\hat{V}_{mcf}$ of the effective command voltage must linearly track the peak command voltage $\hat{V}_c$, the peak command voltage $\hat{V}_c$ can be substituted for the modified effective voltage $\hat{V}_{mcf}$ in Equation 1 so that:

$$\hat{V}_c=\hat{S}_f+\hat{V}_{ccf} \quad \text{Eq. 2}$$

Given Equation 2, if both the fundamental component $S_f$ of the square wave and the fundamental component $V_{ccf}$ of the clipped wave can be expressed as functions of the magnitude S of the square wave, the square wave required to maintain the linear relationship between the command voltage $V_c$ and the resulting fundamental phase voltage can be determined.

It is well known in the art that the fundamental component of a square wave can be expressed as:

$$\hat{S}_f=\frac{4}{\pi} \cdot S \quad \text{Eq. 3}$$

where S is the magnitude of the square wave.

Deriving an S dependent function for the fundamental component $V_{ccf}$ of the clipped control voltage is more complex. To derive the fundamental component $V_{ccf}$ of the clipped voltage, we start with a gain function for a PWM inverter in the typically non-linear region of operation (i.e. where $M_i>1$). As well known in the industry, the fundamental component gain $G_v$ of a PWM inverter where the modulation index $M_i$ is greater than one and the command voltage $V_c$ is purely sinusoidal, can be expressed as:

$$G_v=\frac{\hat{V}_{phf}}{\hat{V}_c}= \quad \text{Eq. 4}$$

$$\frac{1}{\hat{V}_T} \cdot \frac{V_{dc}}{2} \cdot \frac{2}{\pi} \left[ \sin^{-1}\left(\frac{1}{M_i}\right) + \left(\frac{1}{M_i}\right)\sqrt{1-\left(\frac{1}{M_i}\right)^2} \right]$$

Assuming the carrier voltage $V_T$ has a peak magnitude of one:

$$m_i \hat{V}_c \qquad \text{Eq. 5}$$

Normalizing Equation 4 for maximum DC voltage ($V_{dc}/2$), combining Equations 4 and 5, and solving for the fundamental component of the phase voltage:

$$\hat{V}_{phf} = \hat{V}_c \cdot \frac{2}{\pi} \left[ \sin^{-1}\left(\frac{1}{\hat{V}_c}\right) + \left(\frac{1}{\hat{V}_c}\right)\sqrt{1-\left(\frac{1}{\hat{V}_c}\right)^2} \right] \qquad \text{Eq. 6}$$

Referring again to FIG. 4(d), when a square wave of magnitude S is added to the command voltage, the portion of the clipped waveform $V_{cc}$ effecting the fundamental component $V_{phf}$ of phase voltage is reduced so that:

$$\hat{V}_{ccf} = \qquad \text{Eq. 7}$$

$$\hat{V}_c \cdot \frac{2}{\pi} \left[ \sin^{-1}\left(\frac{1-s}{\hat{V}_c}\right) + \left(\frac{1-S}{\hat{V}_c}\right)\sqrt{1-\left(\frac{1-S}{\hat{V}_c}\right)^2} \right]$$

In other words, Equation 7 represents the fundamental component $V_{ccf}$ of the clipped sinusoidal command voltage which contributes to the fundamental phase voltage $V_{phf}$.

Combining Equations 2, 3, and 7 yields the Equation:

$$\hat{V}_c = \frac{4}{\pi} S + \hat{V}_c \cdot \qquad \text{Eq. 8}$$

$$\frac{2}{\pi} \left[ \sin^{-1}\left(\frac{1-S}{\hat{V}_c}\right) + \left(\frac{1-S}{\hat{V}_c}\right)\sqrt{1-\left(\frac{1-S}{\hat{V}_c}\right)^2} \right]$$

Equation 8 includes only two variables, the command voltage $\hat{V}_c$ and the square wave magnitude S. The command voltage $\hat{V}_c$ is known and therefore, the square wave magnitude S required to maintain the linear relationship between the command voltage $\hat{V}_c$ and the fundamental component of phase voltage can be determined.

For each value of the command voltage $\hat{V}_c$, Equation 8 provides a value S indicating the magnitude of the square wave that is required to be added to the command voltage $V_c$ to linearize the relationship between the fundamental component of the phase voltage $V_{phf}$ and the command voltage $V_c$.

While a real time analog or digital implementation of Equation 8 would be possible given an extremely complex and high speed controller, where a controller is not capable of extremely high speed calculations, it would be extremely difficult to implement real time control using Equation 8 without additional hardware. Where a real time implementation of Equation 8 is not possible, a more iterative approach to finding a square wave magnitude S should be employed. Where a controller is digital and includes sufficient memory, Equation 8 can be solved prior to PWM inverter operation for various command voltages $V_c$ and the data can be stored in a look-up table accessible by the controller during operation to determine the magnitude S of the square wave required to maintain the linear relationship desired.

Where the platform of implementation is analog, a look-up table would not be possible. Similarly, where a digital controller and cannot compute the magnitude S of the square wave in the required time, some other solution must be found. In these cases, a simplified equation could be used instead of Equation 8 for either the analog or digital implementations. One simplified Equation that could be used is:

$$\left. \begin{array}{ll} S = K_s(M_i - 1)^2 & , \text{ for } M_i \geq 1 \\ = 0 & , \text{ for } M_i < \end{array} \right\} \qquad \text{Eq. 9}$$

where $K_s$ is a square wave constant. Experiments have shown that linear tracking using Equation 9 matches tracking using Equation 8 quite well.

Hardware Implementation

Referring now to FIG. 5, the present invention will be described in the context of an exemplary 3 phase motor control system 14 including a PWM controller 16 and a PWM inverter 18.

The PWM controller 16 includes a carrier wave generator 28 and a comparator module 30. Referring also to FIG. 1(a), the carrier wave generator 28 produces the carrier voltage signal $V_T$ which is provided to the comparator module 30 along line 32. In addition, the comparator module 30 receives three modified effective sinusoidal command signals $V_{mc}$, $V_{mc}'$, $V_{mc}''$. The comparator module 30 compares each of the modified sinusoidal command signals $V_{mc}$, $V_{mc}'$, $V_{mc}''$ to the carrier signal $V_T$ and produces three firing signals $V_f$, $V_f'$, $V_f''$. In FIGS. 1(a) through 1(c) only a single sinusoidal command signal $V_c$ and signals related thereto are shown in order to simplify this description.

Where the sinusoidal command signal $V_{mc}$ is greater than the carrier signal $V_T$, the comparator module 30 produces a corresponding firing signal $\overline{V}_f$ which is "high." Where a sinusoidal command signal $V_{mc}$ is less than the carrier signal $V_T$, the comparator module 30 produces a corresponding firing signal $\overline{V}_f$ which is "low." Thus, three pulsating firing signals $V_f$, $V_f'$, $V_f''$ are produced that vary in width according to the amplitude of an associated command voltage. The firing signals $V_f$, $V_f'$, $V_f''$ are provided to the PWM inverter 18 which in turn provides phase voltages $V_h$, $V_h'$, $V_h''$ with their respective fundamental components $V_{phf}$, $V_{phf}'$, $V_{phf}''$ to the motor 20.

Figure 6:
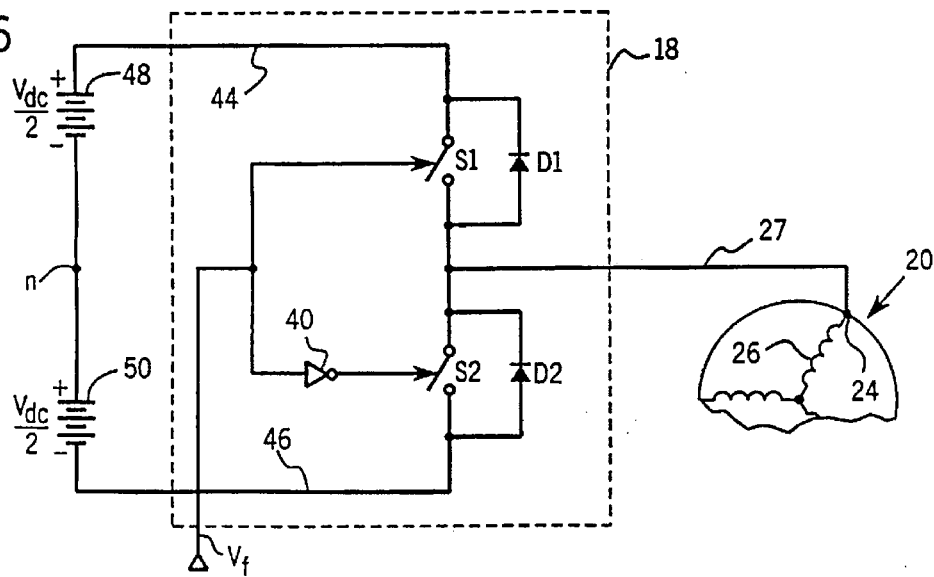
FIG. 6 is a schematic of a single phase of a PWM inverter.

Referring now to FIG. 6, while the inverter and controller described operate to control three separate phases of a three-phase motor, only operation of a single phase will be explained in detail. It should be understood that component corresponding to the two phases which are not described are duplicative in configuration and operation.

For each phase of the three-phases of the motor 20, the inverter 18 includes a pair of switches S1 and S2 (BJT, GTO, IGBT or other transistor technology may be used). Each pair of switches includes an upper switch S1 and a lower switch S2 and each connects to positive or negative DC buses 44, 46 respectively. Each switch S1 and S2 is coupled with an inverse parallel connected diode D1, D2 respectively. Such diodes and their function are well known in the art. A separate one of the three phase winding 26 is electrically connected between the switches S1 and S2.

The firing signal $V_f$ is provided to the upper switch S1. In addition, the firing signal $V_f$ is inverted by inverter 40 producing inverted firing signals $\overline{V}_f$. The inverted firing signal $\overline{V}_f$ is provided to the lower switch S2.

When the inverter switches S1 and S2 are controlled by the firing and inverted firing signals, as an upper switch S1 opens, the corresponding lower switch S2 closes. When an upper switch closes, a corresponding lower switch opens.

A DC voltage source connects the positive and negative DC busses 44, 46. For the purpose of this description, the DC source can be thought of as consisting of both positive and negative series arranged DC sources 48, 50 respectively, that connect the positive and negative DC buses 44, 46. The positive terminal of the positive source 48 is connected to the positive DC bus 44 and its negative terminal is connected at a node n to the positive terminal of the negative DC source 50. The negative terminal of the negative DC source 50 is connected to the negative DC bus 46. Both DC voltage sources 48, 50 produce potentials of identical magnitude but of opposite signs with respect to central point n on the DC voltage source.

Referring to FIGS. 1(b), 1(c), and 6, when the firing signal $V_f$ is received by the inverter 18, the signal $V_f$ is directed to the first switch S1 whereas the corresponding inverted signal $\overline{V}_f$ is directed to the second switch S2. When firing signal $V_f$ is high and $\overline{V}_f$ is low, the first switch S1 is closed and the second switch S2 is opened. In this state, stator winding 26 is connected through line 27 and the first switch S1 to the positive DC bus 44. This produces a positive DC voltage pulse 31 across stator winding 26. This positive pulse 31 has an amplitude equal to the magnitude of the positive DC voltage source 48 (i.e. $+V_{dc}/2/$) and a width equal to the width of the firing signal $V_f$.

When the signal $V_f$ goes low, the inverted firing signal $\overline{V}_f$ goes high. During this time, firing signal $V_f$ opens the first switch S1 and the inverted firing signal $\overline{V}_f$ closes the second switch S2. This disconnects stator winding 26 from the positive DC bus 44 and shortly thereafter connects the stator winding 26, through line 27 and the second switch S2, to the negative DC bus 46. When so connected, a negative DC pulse 32 is generated across winding 26 having an amplitude equal to the magnitude of the negative DC voltage source 50 (i.e. $-V_{dc}/2/$) and a width equal to inverted firing signal $\overline{V}_f$.

By changing the widths of the positive DC pulses 31 with respect to the widths of the negative DC pulses 32 rapidly over time, a changing fundamental component phase voltage $V_{phf}$ which follows the command voltage $V_c$ can be provided across the stator winding 26. This phase voltage $V_{phf}$ gives rise to a phase current $I_{ph}$ which lags the voltage by a phase angle Φ.

Referring again to FIG. 5, a command voltage modifier 52 provides the modified command voltages $V_{mc}$, $V_{mc}'$, $V_{mc}''$ to the comparator module 30. The command voltage modifier 52 receives initial command voltages $V_c$, $V_c'$, $V_c''$, and, where those initial voltages have magnitudes which exceed the peak value of the carrier signal provided by the carrier wave generator 28, the command voltage modifier 52 modifies the initial command voltages $V_c$, $V_c'$, $V_c''$, thus providing the modified command voltages $V_{mc}$, $V_{mc}'$, $V_{mc}''$ in order to maintain the linear relationship between the initial sinusoidal command voltages $V_c$, $V_c'$, $V_c''$ and the fundamental components of the phase voltages applied to the motor.

Again, to simplify this explanation, while the command voltage modifier 52 includes components which modify each of the initial command voltages $V_c$, $V_c'$, $V_c''$, components required to modify only initial command voltage $V_c$ are explained here. It should be understood that identically configured components are provided for each of the three initial command voltages $C_c$, $V_c'$, $V_c''$ and each grouping of components operates in the same manner.

Figure 2A:
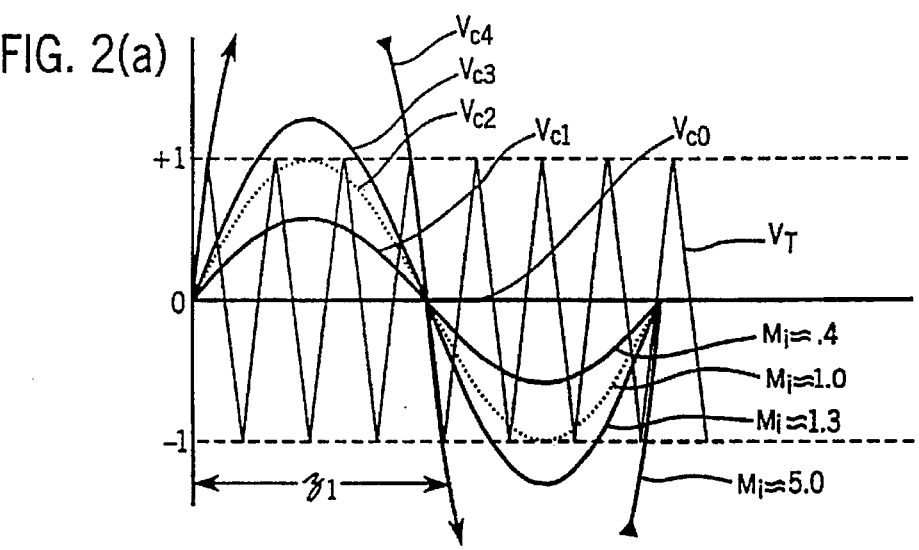
FIG. 2(a) is a graph illustrating various command voltages.
Figure 2B:
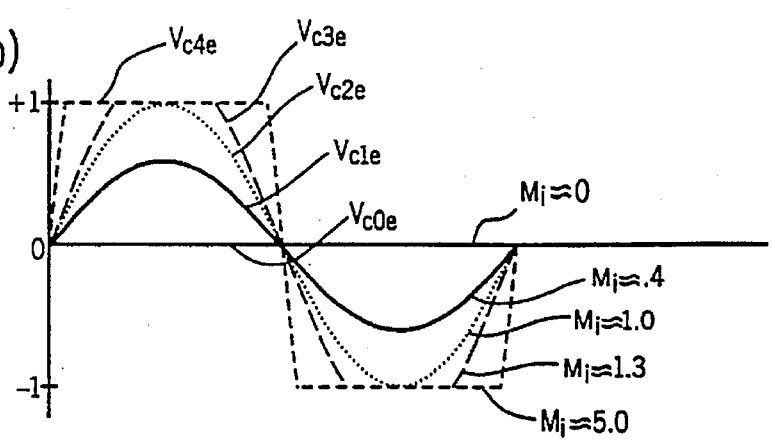
FIG. 2(b) is a graph illustrating effective command voltages corresponding to the command voltages of FIG. 2(a)
Figure 2C:
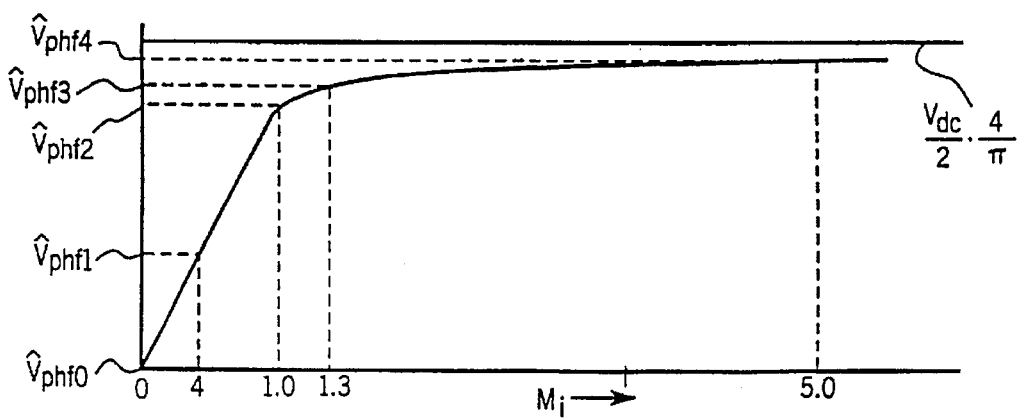
FIG. 2(c) is a graph illustrating the relationship between command voltages and fundamental component phase voltage of a typical prior art PWM.
Figure 7:
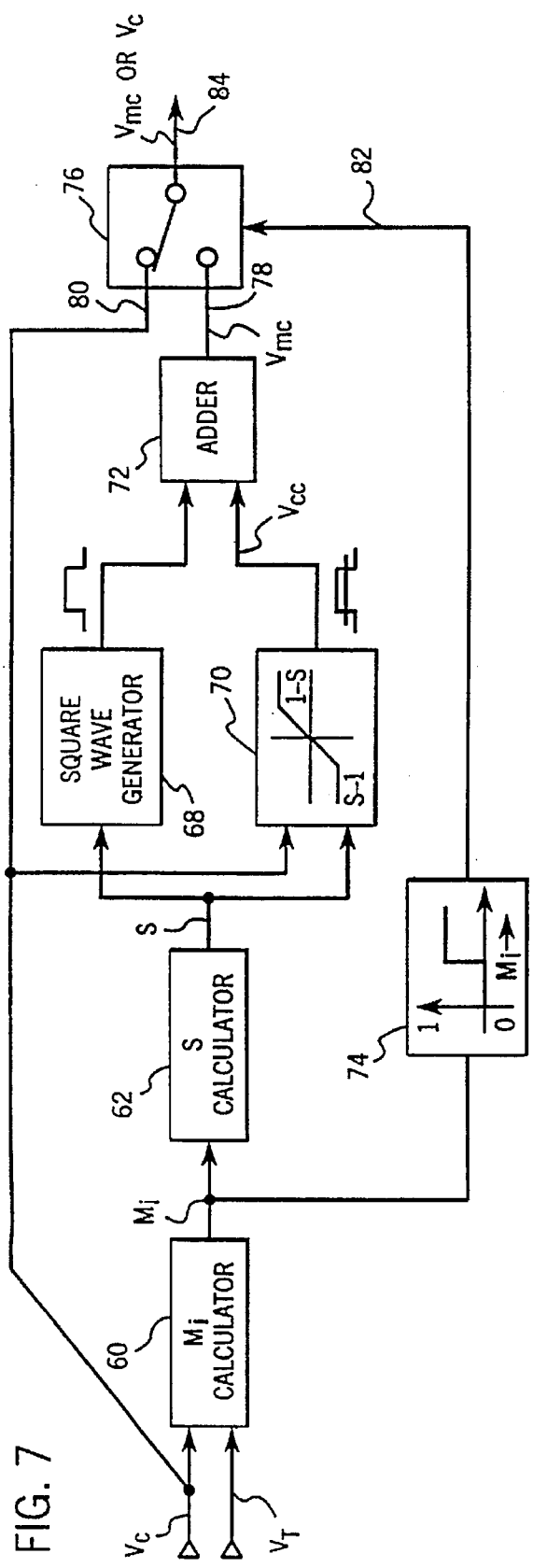
FIG. 7 is a schematic of the command voltage modifier of FIG. 5.
Figure 3:
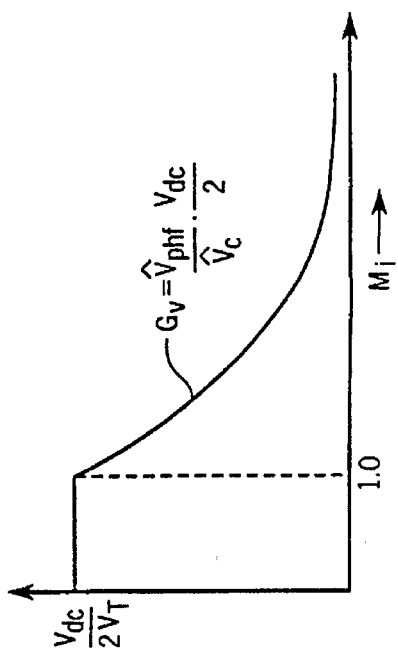
FIG. 3 is a graph illustrating the fundamental component gain of a typical prior art PWM inverter.

Referring now to FIG. 7, the command voltage modifier 52 includes a modulation index calculator 60, a square wave calculator 62, a square wave generator 68, a clipping circuit 70, an adder 72, a comparator 74, and a double pole switch 76. The modulation index calculator 60 receives both the initial command voltage $V_c$ and the carrier signal $V_T$ and divides the peak value $\hat{V}_c$ of the initial command voltage by the peak value of the carrier signal $V_T$ to produce the modulation index $M_i$.

The modulation index $M_i$ is provided to the square wave calculator 62 which determines the magnitude S of the square wave required to maintain the linear relationship between the sinusoidal command voltage $V_c$ and the fundamental component of the phase voltage $V_{phf}$.

Depending on the platform of implementation, the square wave calculator 62 will generate the magnitude S by solving Equation 8 or some other suitable equation for magnitudes. In the alternative, the calculator 62 will search a look-up table to identify a desired magnitude S given the modulation index $M_i$. The magnitude S is provided to both the square wave generator 68 and the clipper circuit 70. The square wave generator 68 generates a square wave which is in phase with the initial command voltage $V_c$ and supplies the square wave to the adder 72. In addition to receiving the magnitude signal S, the clipper circuit 70 receives the initial command voltage $V_c$ and clips any portion of the initial command voltage $V_c$ which is greater than the magnitude 1-S and less than the magnitude S-1 producing a clipped command voltage $V_{cc}$ which is also provided to the adder 72. The clipped command voltage $V_{cc}$ is added to the square wave by adder 72 to produce a modified command voltage $V_{mc}$ on line 78. The modified command voltage $V_{mc}$ is provided to one pole of the double pole switch 76. The other pole of the double pole switch 76 is connected by line 80 to the initial command voltage $V_c$.

The modulation index calculator 60 also provides the modulation index $M_i$ to the comparator 74 which provides a trigger signal to the switch 76 via line 82. When the trigger signal on line 82 is low, the switch 76 connects output line 84 to line 80 and hence to the initial command voltage $V_c$. When the trigger signal on line 82 is high, the switch 76 connects the output line 84 to line 78 and therefore to the modified sinusoidal command signal $V_{mc}$.

The comparator 74 produces a low trigger signal on line 82 when the modulation index $M_i$ is less than unity and produces a high signal on line 82 when the modulation index $M_i$ is greater than unity. Therefore, when the initial peak command voltage $\hat{V}_c$ is less than the peak value $\hat{V}_T$ of the carrier signal, so that the modulation index $M_i$ is less than unity and the PWM inverter will operate in the typically linear region of operation, the initial command voltage $V_c$ will be provided via switch 76 on line 84 to the comparator module 30 for controlling the PWM inverter. On the other hand, when the initial peak command voltage $\hat{V}_c$ is greater than the peak carrier signal $\hat{V}_T$ so that the modulation index $M_i$ is greater than unity and the PWM inverter would typically be operated in the nonlinear region of operation, the modified command voltage $V_{mc}$ is provided on output line 84 via switch 76.

Thus, a simple method and apparatus for extending the linear relationship between a sinusoidal command signal and the resulting fundamental component of phase voltage to cover all possible phase voltage values has been described.

While this description has been by way of example how the present invention can be carried out, those with experience in the art will recognize that various parts of the preferred embodiment may be modified to provide other embodiments which come within the scope of the invention. For example, referring to FIG. 7, while the command voltage modifier 52 is described as having a clipper circuit 70 to maintain the modified command voltage $V_{mc}$ below or equal to the peak value $\hat{V}_T$ of the carrier signal, the clipper circuit 70 is not necessary because the portion of the modified voltage $V_{mc}$ which exceeds the peak carrier signal would naturally be clipped off by the PWM inverter upon saturation. In addition, other signals, other than the square wave having a magnitude S, could be calculated that, when added to the initial sinusoidal command signal, would linearize the command voltage/fundamental phase voltage relationship. The present invention is meant to cover these other signals. For example, instead of a square wave, a modifier signal may comprise a square wave less the portion of the initial command voltage which will be clipped off by the PWM inverter once the square wave is added to the initial command voltage. Other modifier signals are also possible, the important characteristic of the modifier signal being that, when the modifier signal is added to the initial sinusoidal command signal, the resulting fundamental phase voltage linearly tracks the initial sinusoidal command signal throughout it possible range.

Furthermore, while the invention is described above in the context of a three-phase motor controller and inverter, it should be understood that the invention could be used with any PWM inverter or converter to change AC to DC or DC to AC voltage. This includes single phase as well as multiphase configurations.

Therefore, to apprise the public of the scope of the invention and the embodiments covered by the invention the following claims are made:

I claim:

1. A method to be used with a PWM inverter which receives a sinusoidal command signal having a peak command value and a high frequency carrier signal having a peak carrier value and generates a series of high frequency voltage pulses therefrom the fundamental component of which over the period of the sinusoidal command is a phase voltage, a modulation index being the ratio of the peak command value to a peak carrier value, the phase voltage being variable within a phase voltage range and being substantially linearly related to the sinusoidal command signal when the modulation index is less than unity, the method for extending the linear relationship between the sinusoidal command signal and the phase voltage to include the entire phase voltage range, the method comprising the steps of:

(a) determining if the modulation index is greater than unity and where the modulation index is greater than unity;
   (b) identifying a modifier signal in phase with the sinusoidal command signal;
   (c) mathematically combining the modifier signal with the sinusoidal command signal to provide a modified sinusoidal command signal; and
   (d) providing the modified sinusoidal command signal to the inverter for comparison with said carrier signal to generate a phase voltage;

wherein, the modifier signal is such that, when the modified sinusoidal command signal is compared to the carrier signal, the inverter generates a fundamental component phase voltage that substantially maintains the linear relationship with the command signal.

2. The method of claim 1 wherein the step of identifying a modifier signal includes the step of identifying a square wave.

3. The method of claim 2 wherein the step of identifying includes the steps of solving the equation:

$$\hat{V}_c = \frac{4}{\pi} S + \hat{V}_c \cdot$$

$$\frac{2}{\pi} \left[ \sin^{-1}\left(\frac{1-S}{\hat{V}_c}\right) + \left(\frac{1-S}{\hat{V}_c}\right)\sqrt{1-\left(\frac{1-S}{\hat{V}_c}\right)^2} \right]$$

for S, where $\hat{V}_c$ is the peak value of the sinusoidal command signal, and using S as the magnitude of the square wave.

4. The method of claim 1 wherein the step of mathematically combining includes the step of adding the modifier signal to the sinusoidal command signal.

5. The method of claim 1 further including the step of, prior to providing the modified sinusoidal command signal, altering the modified sinusoidal command signal so that no part of the sinusoidal command signal has a magnitude which is greater than the peak carrier signal value.

6. The method of claim 3 further including the step of, prior to providing the modified sinusoidal command signal, altering the modified sinusoidal command signal so that no part of the sinusoidal command signal has a magnitude which is greater than the peak carrier signal value.

7. The method of claim 2 wherein the step of identifying a square wave includes the steps of solving the equation:

$$\begin{aligned} S &= K_s(M_i - 1)^2 &, \text{ for } M_i \geq 1 \\ &= 0 &, \text{ for } M_i < \end{aligned}$$

for S, where $K_s$ is a constant and $M_i$ is the modulation index, and using S as the magnitude of the square wave.

8. The method of claim 1 wherein the inverter includes a look-up table consisting of a plurality of modifier signals which have been generated off line as a function of different sinusoidal command signals, and the step of identifying includes the step of identifying a modifier signal in the look-up table which corresponds to a specific sinusoidal command signal.

9. The method of claim 2 wherein the inverter includes a look-up table consisting of a plurality of modifier signals which have been generated off line as a function of different sinusoidal command signals, each modifier signal including square wave magnitude data generated by solving the equation:

$$\hat{V}_c = \frac{4}{\pi} S + \hat{V}_c \cdot$$

$$\frac{2}{\pi} \left[ \sin^{-1}\left(\frac{1-S}{\hat{V}_c}\right) + \left(\frac{1-S}{\hat{V}_c}\right)\sqrt{1-\left(\frac{1-S}{\hat{V}_c}\right)^2} \right]$$

for S, where S is the magnitude of the square wave and $\hat{V}_c$ is the peak sinusoidal command signal value.

10. An apparatus to be used with a PWM inverter which receives a sinusoidal command signal having a peak command value and a high frequency carrier signal having a peak carrier value and generates a series of high frequency voltage pulses therefrom the fundamental component of which over the period of the sinusoidal command is a phase voltage, a modulation index being the ratio of the peak command value to a peak carrier value, the phase voltage being variable within a phase voltage range and being substantially linearly related to the sinusoidal command signal when the modulation index is less than unity, the apparatus used for extending the linear relationship between the sinusoidal command signal and the phase voltage to include the entire phase voltage range, the apparatus comprising:

(a) a comparator to determine if the modulation index is greater than unity and where the modulation index is greater than unity;

(b) a first calculator to identify a modifier signal in phase with the sinusoidal command signal;

(c) a second calculator to mathematically combine the modifier signal with the sinusoidal command signal to provide a modified sinusoidal command signal; the second calculator supplying the modified sinusoidal command signal to the inverter for comparison with said carrier signal to generate a phase voltage;

wherein, the modifier signal is such that, when the modified sinusoidal command signal is compared to the carrier signal, the inverter generates a fundamental component phase voltage that substantially maintains the linear relationship with the command signal.

11. The apparatus of claim 10 wherein the first calculator identifies a square wave.

12. The apparatus of claim 11 wherein the first calculator includes a selector which identifies a square wave by solving the equation:

$$\hat{V}_c = \frac{4}{\pi} S + \hat{V}_c \cdot$$

$$\frac{2}{\pi} \left[ \sin^{-1}\left(\frac{1-S}{\hat{V}_c}\right) + \left(\frac{1-S}{\hat{V}_c}\right)\sqrt{1 - \left(\frac{1-S}{\hat{V}_c}\right)^2} \right]$$

for S, where S is the magnitude of the square wave and $\hat{V}_c$ is the peak sinusoidal command signal value.

13. The apparatus of claim 10 wherein the second calculator includes an adder which mathematically combines by adding the modifier signal to the sinusoidal command signal.

14. The apparatus of claim 10 wherein the second calculator further includes a clipper that, prior to providing the modified sinusoidal command signal, alters the modified sinusoidal command signal so that no part of the sinusoidal command signal has a magnitude which is greater than the peak carrier signal value.

15. The apparatus of claim 11 wherein the first calculator includes a selector which identifies a square wave by solving the equation:

$$\begin{aligned} S &= K_s(M_i - 1)^2 &, \text{ for } M_i \geq 1 \\ &= 0 &, \text{ for } M_i < \end{aligned}$$

for S, where S is the magnitude of the square wave, $K_s$ is a constant and $M_i$ is the modulation index.

16. The apparatus of claim 10 wherein the inverter includes a look-up table consisting of a plurality of modifier signals which have been generated off line as a function of different sinusoidal command signals, and the first calculator includes a searcher for searching the look-up table to identify a modifier signal in the look-up table which corresponds to a specific sinusoidal command signal.

17. An apparatus to be used with a PWM inverter which receives a sinusoidal command signal having a peak command value and a high frequency carrier signal having a peak carrier value and generates a series of high frequency voltage pulses therefrom the fundamental component of which over the period of the command signal is a phase voltage, a modulation index being the ratio of the peak command value to a peak carrier value, the phase voltage being variable within a phase voltage range and being substantially linearly related to the sinusoidal command signal when the modulation index is less than unity, the apparatus used for extending the linear relationship between the sinusoidal command signal and the phase voltage to include the entire phase voltage range, the apparatus comprising:

(a) a comparator to determine if the modulation index is greater than unity and where the modulation index is greater than unity;

(b) a first calculator to identify the magnitude of a square wave;

(c) a square wave generator for generating a square wave that is in phase with the sinusoidal command signal and has the magnitude identified by the first calculator; and (d) a second calculator to mathematically combine the square wave with the sinusoidal command signal to provide a modified sinusoidal command signal, the second calculator supplying the modified sinusoidal command signal to the inverter for comparison with said carrier signal to generate a fundamental component phase voltage;

wherein, the square wave magnitude is such that, when the modified sinusoidal command signal is compared to the carrier signal, the inverter generates a fundamental component phase voltage that substantially maintains a linear relationship with the command signal.

18. The apparatus as recited in claim 17 wherein the second calculator includes a clipper that, prior to providing the modified sinusoidal command signal, alters the modified sinusoidal command signal so that no part of the sinusoidal command signal has a magnitude which is greater than the peak carrier signal value.

* * * * *